(12) United States Patent
Lambert et al.

(10) Patent No.: US 10,853,512 B2
(45) Date of Patent: Dec. 1, 2020

(54) SYSTEM AND METHOD OF OPERATING AN INFORMATION HANDLING SYSTEM WITH A MANAGEMENT CONTROLLER

(71) Applicant: Dell Products L.P., Round Rock, TX (US)

(72) Inventors: Timothy M. Lambert, Austin, TX (US); Anh Dinh Luong, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 274 days.

(21) Appl. No.: 15/970,122

(22) Filed: May 3, 2018

(65) Prior Publication Data

US 2019/0340375 A1    Nov. 7, 2019

(51) Int. Cl.
*G06F 21/62* (2013.01)
*H04L 29/06* (2006.01)

(52) U.S. Cl.
CPC ...... *G06F 21/6218* (2013.01); *H04L 63/0823* (2013.01); *H04L 63/108* (2013.01)

(58) Field of Classification Search
None
See application file for complete search history.

(56) References Cited

U.S. PATENT DOCUMENTS

| 5,295,258 | A | 3/1994 | Jewett et al. |
| 5,857,074 | A | 1/1999 | Johnson |
| 5,892,928 | A | 4/1999 | Wallach et al. |
| 5,905,867 | A | 5/1999 | Giorgio |
| 6,263,452 | B1 | 7/2001 | Jewett et al. |
| 2008/0086642 | A1* | 4/2008 | Takahashi ............. H04L 9/3247 713/176 |
| 2012/0173922 | A1* | 7/2012 | Cheng ................. G06F 11/1417 714/13 |
| 2017/0102952 | A1* | 4/2017 | Khemani ............ G06F 13/4282 |

(Continued)

OTHER PUBLICATIONS

Compaq, "Eliminating Single Points of Failure and Enabling Rapid Recovery in Server Subsystems." Technology Brief, Nov. 1997; 13 pages.

(Continued)

*Primary Examiner* — Joseph P Hirl
*Assistant Examiner* — Hassan Saadoun
(74) *Attorney, Agent, or Firm* — Baker Botts L.L.P.

(57) ABSTRACT

In one or more embodiments, one or more systems, method, and/or processes may receive information from each of multiple components of an information handling system; may associate the information from each of the multiple components with at least one category of multiple categories; may store the information from each of the multiple components; may receive authorization information that includes a digital certificate that indicates authorization to the at least one category; may determine that the authorization information provides access to the at least one category; and in response to determining that the authorization information provides access to the at least one category: may provide the information from at least one component associated with the at least one category to a user; and may provide communications between the at least one component and the user.

20 Claims, 7 Drawing Sheets

(56) References Cited

U.S. PATENT DOCUMENTS

2019/0089545 A1* 3/2019 Dias Correa ....... H04L 63/0823

OTHER PUBLICATIONS

Compaq, "Compaq ProLiant 7000 Server Technology." Technology Brief, Jun. 1998; 23 pages.
"Intelligent Platform Management Bus Communications Protocol Specification." IPMI, v1.0, Nov. 15, 1999; 40 pages.
Compaq, "Remote Server Management Integrated Remote Console." Oct. 1996; 7 pages.
"Intelligent Platform Management Interface Specification Second Generation." IPMI, v2.0, Oct. 1, 2013; 644 pages.
DMTF, "Management Component Transport Protocol (MCTP)." Overview White Paper, Version 1.0.0a, Jul. 2007; 15 pages.
Zhuo, Haihong et al. "Remote Management with the Baseboard Management Controller in Eighth-Generation Dell PowerEdge Servers." Dell Power Solutions, Oct. 2004; 4 pages.
DMTF, "Management Component Transport Protocol (MCTP) Base Specification." Version 1.3.0, Nov. 24, 2016; 94 pages.
"Platform Event Trap Format Specification." IPMI, v1.0, Dec. 7, 1998; 21 pages.
DMTF, "Management Component Transport Protocol (MCTP) SMBus/I2C Transport Binding Specification." Version 1.1.0, May 21, 2017; 36 pages.
IBM, "Advanced Systems Management Adapter Installation Instructions." IBM PC Server, First Edition, Aug. 1998; 68 pages.

* cited by examiner

[ 0.000000] x86/fpu: Supporting XSAVE feature 0x001: 'x87 floating point registers'
[ 0.000000] x86/fpu: Supporting XSAVE feature 0x002: 'SSE registers'
[ 0.000000] x86/fpu: Supporting XSAVE feature 0x004: 'AVX registers'
[ 0.000000] x86/fpu: xstate_offset[2]: 576, xstate_sizes[2]: 256
[ 0.000000] x86/fpu: Enabled xstate features 0x7, context size is 832 bytes, using 'standard' format.
[ 0.000000] e820: BIOS-provided physical RAM map:
[ 0.000000] BIOS-e820: [mem 0x0000000000000000-0x000000000009f3ff] usable
[ 0.000000] BIOS-e820: [mem 0x000000000009f400-0x000000000009ffff] reserved
[ 0.000000] BIOS-e820: [mem 0x00000000000dc000-0x00000000000fffff] reserved
[ 0.000000] BIOS-e820: [mem 0x0000000000100000-0x000000001feeffff] usable
[ 0.000000] BIOS-e820: [mem 0x000000001fef0000-0x000000001fefefff] ACPI data
[ 0.000000] BIOS-e820: [mem 0x000000001feff000-0x000000001fefffff] ACPI NVS
[ 0.000000] BIOS-e820: [mem 0x000000001ff00000-0x000000001fffffff] usable
[ 0.000000] BIOS-e820: [mem 0x00000000f0000000-0x00000000f7ffffff] reserved
[ 0.000000] NX (Execute Disable) protection: active
[ 0.000000] random: fast init done
[ 0.000000] SMBIOS 2.7 present.
[ 0.000000] e820: update [mem 0x00000000-0x00000fff] usable ==> reserved
[ 0.000000] e820: remove [mem 0x000a0000-0x000fffff] usable
[ 0.000000] e820: last_pfn = 0x20000 max_arch_pfn = 0x400000000
[ 0.000000] MTRR default type: uncachable
[ 0.000000] MTRR fixed ranges enabled:
[ 0.000000]   00000-9FFFF write-back
[ 0.000000]   A0000-BFFFF uncachable
[ 0.000000]   C0000-CBFFF write-protect
[ 0.000000]   CC000-EFFFF uncachable
[ 0.000000]   F0000-FFFFF write-protect
[ 0.000000] MTRR variable ranges enabled:
[ 0.000000]   0 base 00000000000 mask 3FFE0000000 write-back
[ 0.000000] Zone ranges:
[ 0.000000]   DMA      [mem 0x0000000000001000-0x0000000000ffffff]
[ 0.000000]   DMA32    [mem 0x0000000001000000-0x000000001fffffff]
[ 0.000000] Memory: 495096K/523832K available (6644K kernel code, 1134K rwdata, 2048K rodata, 1336K init, 908K bss, 28736K reserved, 0K cma-reserved)
[ 0.000000] SLUB: HWalign=64, Order=0-3, MinObjects=0, CPUs=1, Nodes=1
[ 0.000000] ftrace: allocating 28354 entries in 111 pages
[ 0.003333] Preemptible hierarchical RCU implementation.

*Management Controller*

*1) Management Engine*
*2) System Management Unit*
*3) Management Controller Console*
*4) RAID Console*
*5) Pre-POST Log*
*6) POST Log*
*7) Exit*

*Enter Selection:*

SYSTEM AND METHOD OF OPERATING AN INFORMATION HANDLING SYSTEM WITH A MANAGEMENT CONTROLLER

BACKGROUND

Field of the Disclosure

This disclosure relates generally to information handling systems and more particularly to utilizing a management controller with an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, method, and/or processes may receive information from each of multiple components of an information handling system; may associate the information from each of the multiple components with at least one category of multiple categories; may store the information from each of the multiple components; may receive authorization information that includes a digital certificate that indicates authorization to the at least one category; may determine that the authorization information provides access to the at least one category; and in response to determining that the authorization information provides access to the at least one category: may provide the information from at least one component associated with the at least one category to a user; and may provide communications between the at least one component and the user. In one or more embodiments, providing the communications between the at least one component and the user may include providing the communications between the at least one component and the user via at least one of a serial port of the information handling system and a network coupled to the information handling system, among others.

In one or more embodiments, the digital certificate may indicate authorization to the at least one category for an amount of time. For example, the one or more systems, method, and/or processes may further determine that the amount of time has concluded and, in response to determining that the amount of time has concluded, deny access to the at least one category. In one or more embodiments, receiving information from each of the multiple components of the information handling system may include receiving the information from each of the multiple components before a power on self test (POST) of the information handling system. In one or more embodiments, providing the information to the user may be performed after an operating system error that caused the information handling system to reset. In one or more embodiments, the one or more systems, method, and/or processes may further determine that the authorization information does not provide access to another category of the multiple categories. For example, the one or more systems, method, and/or processes may further deny access to the other category.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIG. 4A illustrates an example of output from an information handling system, according to one or more embodiments;

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, information handling system firmware may disable serial port console output. For example, a serial port of the information handling system, which may be utilized for a console of the information handling system, may not be utilized in providing information to one or more users (e.g., one or more administrators) during one or more boot sequences. For instance, a speed of the serial port may reduce one or more speeds of one or more boots sequences when an amount of information associated with one or more boot sequences meets a threshold. In one or more embodiments, one or more boot sequences may include one or more of a pre power on self test (POST), a POST, and an operating system boot, among others.

In one or more embodiments, a baseboard management controller may provide information associated with one or more boot sequences, which may be useful to one or more users (e.g., one or more administrators). In one example, the information associated with one or more boot sequences may include one or more statuses of one or more components of the information handling system. In one instance, a status may indicate a successful operational state. In another instance, a status may indicate one or more errors. In another example, the information associated with one or more boot sequences may information associated with one or more components of the information handling system. For instance, the information associated with the one or more components of the information handling system may include configuration information associated with the one or more components of the information handling system. In one or more embodiments, the configuration information may indicate how the one or more components of the information handling system are configured. In one or more embodiments, if one or more users were able to access information associated with one or more boot sequences, a reduction of a number of service calls may be reduced. In one example, if a number of service calls is reduced, an amount of energy of utilizing one or more information handling systems may be reduced. In another example, if a number of service calls is reduced, an amount of energy associated with the service calls may be applied to other and/or better uses.

In one or more embodiments, a baseboard management controller may access one or more components of an information handling system. For example, the baseboard management controller may relay information from the one or more components of the information handling system to a user. For instance, the one or more components may include one or more of a micro controller, a complex logic device, general purpose input/output (GPIO), a field programmable gate array, a storage controller, an Intel Management Engine, and an AMD Platform Security Processor, a root complex, and a bus, among others. In one or more embodiments, a component of the information handling system may be or include a subsystem of the information handling system. In one or more embodiments, the baseboard management controller may function as a concentrator and/or a hub for information to and/or from the one or more components and the user. In one or more embodiments, the baseboard management controller may store and/or record information. For example, the baseboard management controller may store and/or record information from the one or more components for later use and/or analysis by the user. For instance, the baseboard management controller may playback stored and/or recorded information from the one or more components. In one or more embodiments, playing back stored and/or recorded information from the one or more components may include enabling, permitting, and/or allowing a user to scroll back through a log and/or an output of the one or more components.

In one or more embodiments, the baseboard management controller may provide local access for the user. In one example, the baseboard management controller may provide local display, mouse, and/or keyboard access for the user. In another example, the baseboard management controller may provide local serial port console access for the user. In one or more embodiments, the baseboard management controller may provide remote access for the user. For example, the user may access the baseboard management controller via a network.

Figure 1:
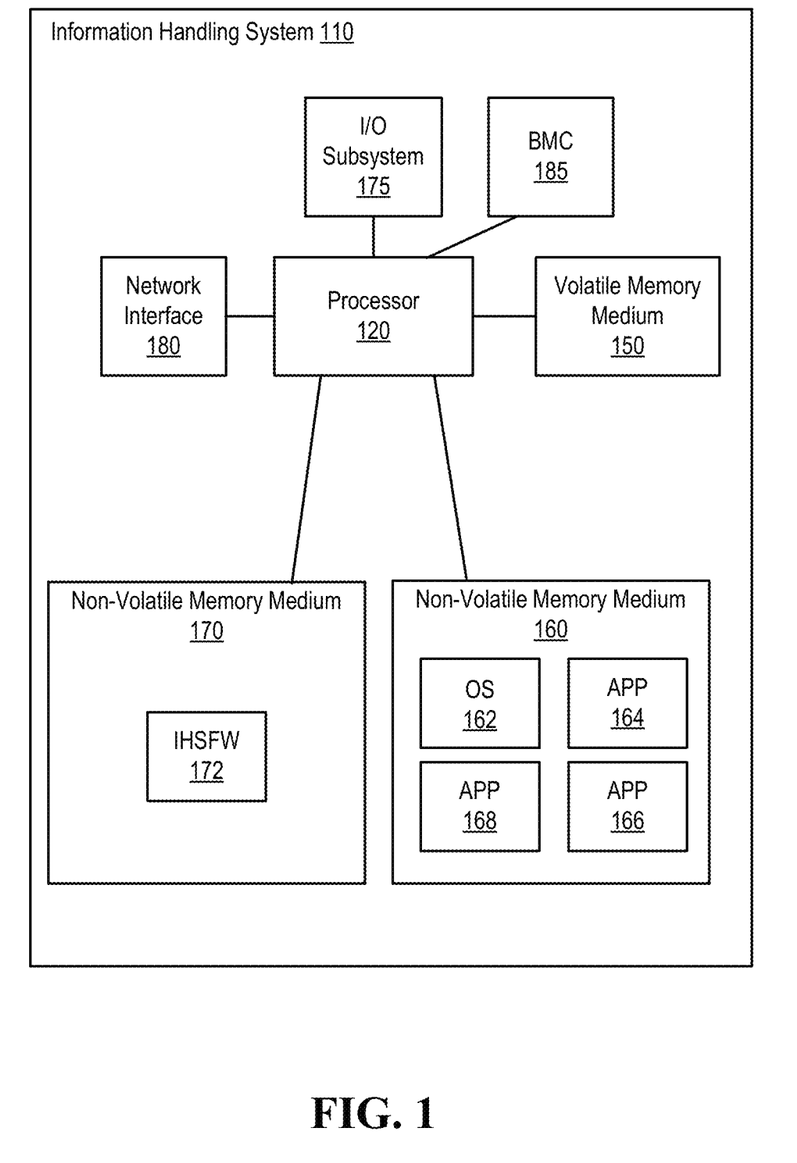
FIG. 1 illustrates an example of an information handling system, according to one or more embodiments.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, and a baseboard management controller (BMC) 185. As illustrated, volatile memory medium 150, non-volatile memory media 160 and 170, I/O subsystem 175, network interface 180, and BMC 185 may be communicatively coupled to processor 120.

In one or more embodiments, one or more of volatile memory medium 150, non-volatile memory media 160 and 170, I/O subsystem 175, network interface 180, and BMC 185 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, BMC 185 may be or include a remote access controller. For example, the remote access controller may be or include a Dell Remote Access Controller (DRAC). In one or more embodiments, a remote access controller may be integrated into IHS 110. For example, the remote access controller may be or include an integrated Dell Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. For example, the remote access controller may be based at least on an Intelligent Platform Management Interface (IPMI) standard. For instance, the remote access controller may allow and/or permit utilization of IPMI out-of-band interfaces such as IPMI Over LAN (local area network). In one or more embodiments, a remote access controller may include and/or provide one or more internal private networks. For example, the remote access controller may include and/or provide one or more of an Ethernet interface, a front panel USB interface, and a Wi-Fi interface, among others.

In one or more embodiments, BMC 185 may be or include an application processor. In one or more embodiments, BMC 185 may be or include a microcontroller. For example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 185 may be or include one or more of a FPGA and an ASIC, among others, configured, coded, and/or encoded with instructions in accordance with one or more of systems, flowcharts, methods, and/or processes described herein.

In one or more embodiments, processor 120 and one or more components of IHS 110 may be included in a system-on-chip (SoC). For example, the SoC may include processor 120 and a platform controller hub (not specifically illustrated).

Figure 2:
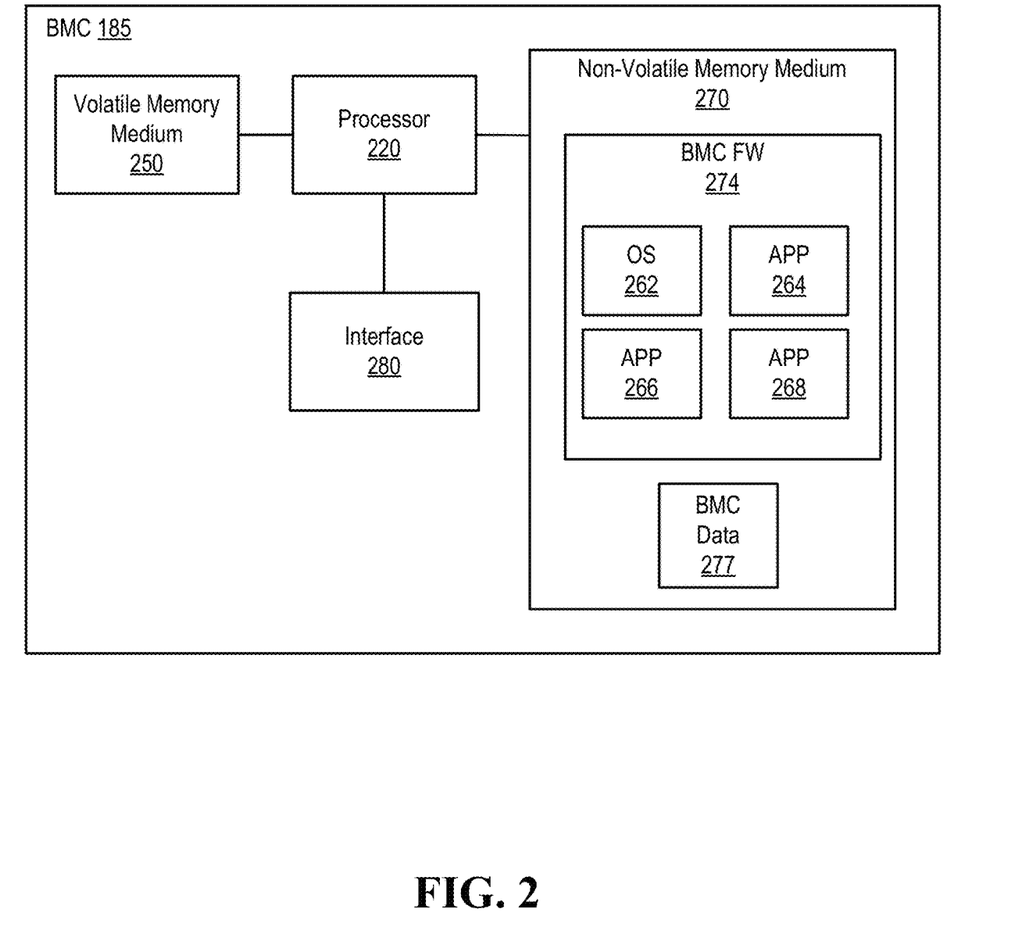
FIG. 2 illustrates an example baseboard management controller, according to one or more embodiments.

Turning now to FIG. 2, an example baseboard management controller is illustrated, according to one or more embodiments. As shown, BMC 185 may include a processor 220, a volatile memory medium 250, a non-volatile memory medium 270, and an interface 280. As illustrated, non-volatile memory medium 274 may include a BMC FW 274, which may include an OS 262 and APPs 264-268, and may include BMC data 277. For example, OS 262 may be or include a real-time operating system (RTOS).

In one or more embodiments, interface 280 may include circuitry that enables communicatively coupling to one or more devices. In one example, interface 280 may include circuitry that enables communicatively coupling to one or more buses. In a second example, interface 280 may include circuitry that enables one or more interrupt signals to be received. In one instance, interface 280 may include GPIO circuitry, and the GPIO circuitry may enable one or more interrupt signals to be received and/or provided via at least one interrupt line. In another instance, interface 280 may include GPIO circuitry that may enable BMC 185 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface. In one or more embodiments, interface 280 may include one or more structures and/or functionalities as those described with reference to I/O subsystem 175. For example, interface 280 may include one or more user input interfaces, one or more communication interfaces, one or more graphics interfaces, one or more video interfaces, and/or one or more peripheral interfaces, among others.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with one or more of systems, flowcharts, methods, and/or processes described herein. For example, non-volatile memory medium 270 and/or volatile memory medium 260 may store instructions that may be executable in accordance with one or more of systems, flowcharts, methods, and/or processes described herein. In one or more embodiments, processor 220 may utilize BMC data 277. In one example, processor 220 may utilize BMC data 277 via non-volatile memory medium 270. In another example, one or more portions of BMC data 277 may be transferred to volatile memory medium 250, and processor 220 may utilize BMC data 277 via volatile memory medium 250.

Figure 3:
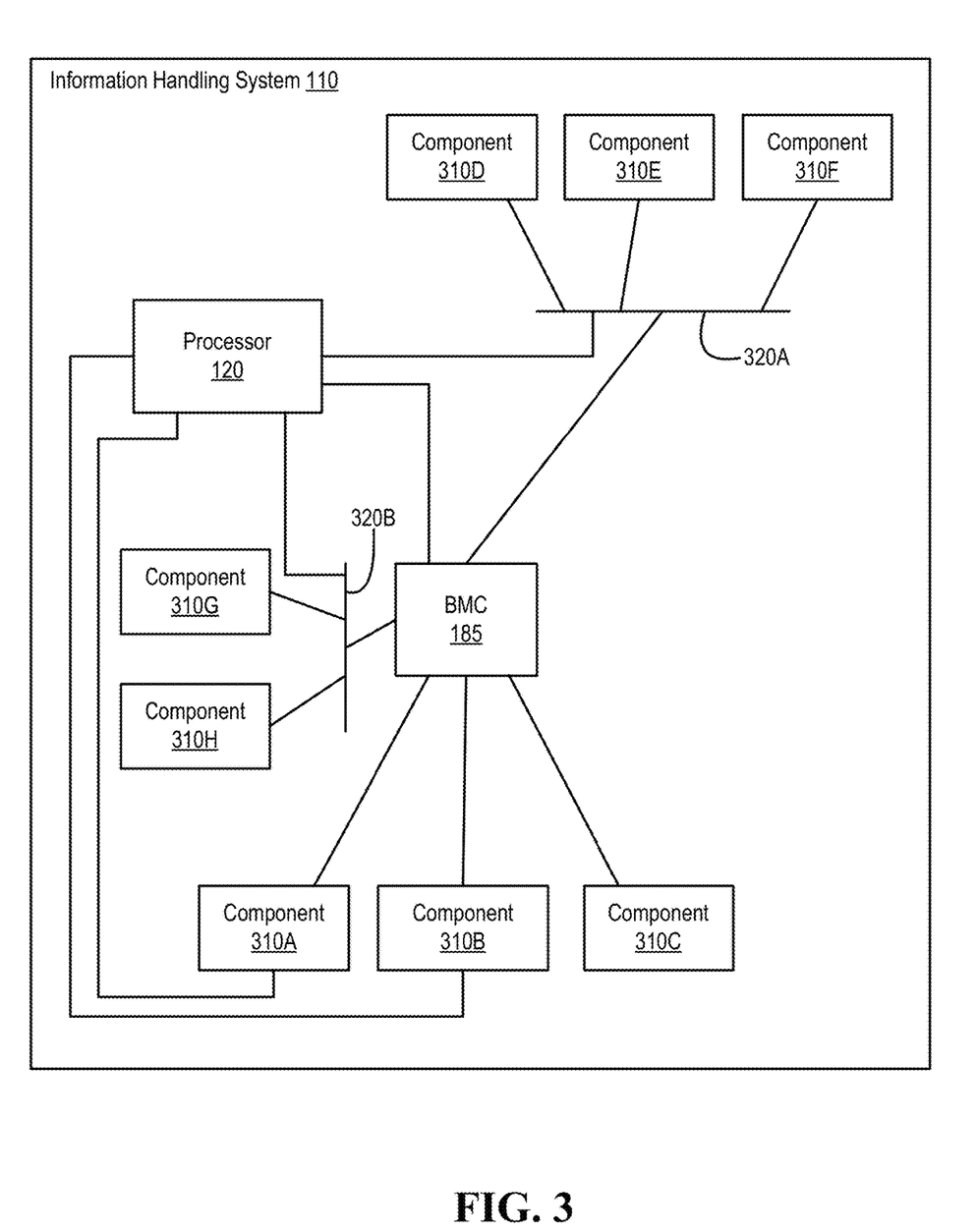
FIG. 3 illustrates another example of an information handling system, according to one or more embodiments.

Turning now to FIG. 3, another example of an information handling system is illustrated, according to one or more embodiments. As shown, BMC 185 may be coupled to components 310D-310H of IHS 110. As illustrated, BMC

185 may be coupled to buses 320A and 320B of IHS 110. In one example, bus 320 may include be or include one or more of a memory bus, a peripheral bus, and a local bus, among others. In a second example, bus 320 may be or include one or more of a MCA bus, an ISA bus, an EISA bus, a PCI bus, a HT bus, an I$^2$C bus, a SPI bus, a LPC bus, an eSPI bus, a USB, a SMBus, and a VESA local bus, among others. In one or more embodiments, a bus 320 may be or include a communications fabric. As shown, components 310D-310F may be coupled to bus 320A. As illustrated, components 320G and 310H may be coupled to bus 320B. As shown, processor 120 may be coupled to buses 320A and 320B. As shown, processor 120 may be coupled to components 310A and 310B.

In a third example, a component 310 may be or include any component of IHS 110. For instance, component 310 may be or include one or more of processor 120, volatile memory medium 150, non-volatile memory medium 160, non-volatile memory medium 170, I/O subsystem 175, and network interface 180, among others. In another example, a component 310 may be or include a FPGA, an ASIC, a complex logic device (CPLD), a RAID controller, a microcontroller, an application processor, a SAS controller, an integrated circuit (IC), a SoC, a PCIe root complex, a bridge, a management engine (e.g., Intel's Management Engine, AMD's Platform Security Processor, etc.), a system management unit, and an embedded controller, among others. In one or more embodiments, a bus 320 may be a component of IHS 110.

In one or more embodiments, BMC 185 may receive information from one or more of components 310A-310H. In one example, BMC 185 may receive information from one or more of components 310A-310C via one or more respective couplings. In a second example, BMC 185 may receive information from one or more of components 310D-310F via bus 320A. In another example, BMC 185 may receive information from one or more of components 310G and 310H via bus 320B. In one or more embodiments, BMC 185 may monitor a bus 320. In one or more embodiments, any information that is transmitted via bus 320 may be monitored by BMC 185. In one example, component 310F may communication information with processor 120 via bus 320A. For instance, BMC 185 may receive the information that component 310F communicates with processor 120. In a second example, component 310D may communication information with component 310E via bus 320A. For instance, BMC 185 may receive the information that component 310D communicates with component 310E. In another example, component 310D may communication information with components 310E and 310F via bus 320A. For instance, BMC 185 may receive the information that component 310D communicates with components 310E and 310F.

In one or more embodiments, BMC 185 may store any information that it receives. For example, BMC 185 may store and/or record any information from one or more components 310 and/or from one or more buses 320, among others. In one or more embodiments, BMC 185 may provide any information that it received. For example, BMC 185 may play back any information from one or more components 310 and/or from one or more buses 320, among others. In one or more embodiments, information that BMC 185 receives may be categorized. For example, information that BMC 185 receives may be sorted into categories. In one instance, information from a category may be selected. In another example, information from a category may require authorization.

In one or more embodiments, an authorization may include a licensed authorization. For example, a license may be required to retrieve information from a category. In one instance, the license may be or include a license key. In another instance, the license may be or include a digital certificate. In one or more embodiments, the digital certificate may be formatted in accordance with a X.509 standard. For example, the digital certificate may be or include a X.509 certificate. In one or more embodiments, the digital certificate may include one or more scope qualifiers. For example, one or more scope qualifiers may include one or more permissions that may permit, allow, and/or enable access to information of one or more categories. In one or more embodiments, the digital certificate may include one or more time attributes. In one example, a time attribute may indicate that access to information that BMC 185 has received may be accessed during one or more periods of time. In another example, a time attribute may indicate that access to information that BMC 185 has received may be expire at a certain time and/or after an amount of time transpiring. In one or more embodiments, permitting access to information received and/or collected by BMC 185 may provide security for IHS 110. For example, the information received and/or collected by BMC 185 may be utilized by a potential attacker. For instance, controlling access to the information received and/or collected by BMC 185 may improve one or more functions and/or functionality of IHS 110.

In one or more embodiments, categorizing information received and/or collected by BMC 185 may improve one or more functions and/or one or more functionalities of IHS 110. For example, a user (e.g., an administrator) may utilized one or more categories of information to determine one or more improvements and/or to determine one or more issues associated with IHS 110. In one instance, categorizing information received and/or collected by BMC 185 may improve speed of improvements associated with IHS 110. In another instance, categorizing information received and/or collected by BMC 185 may improve speed of resolving one or more issues associated with IHS 110.

In one or more embodiments, BMC 185 receiving and/or collecting information from one or more of components 310A-310H, among others, and/or from one or more of buses 320A and 320B, among others, IHS 110 may boot in a more expedient manner and may maintain the information from the one or more of components 310A-310H, among others, and/or from the one or more of buses 320A and 320B, among others. In one example, providing the information from the one or more of components 310A-310H, among others, and/or from the one or more of buses 320A and 320B, among others, to a display and/or a serial port may slow down and/or otherwise impede a performance of IHS 110. In another example, providing the information from the one or more of components 310A-310H, among others, and/or from the one or more of buses 320A and 320B, among others, to a display and/or a serial port may discard the information. In one or more embodiments, BMC 185 may perform one or more actions described herein even when IHS 110 is shut down, in a failed state, or during an operating system runtime, among others.

Turning now to FIG. 4A, an example of output from an information handling system is illustrated, according to one or more embodiments. As shown, a user interface (UI) 410 may provide output from IHS 110. In one example, the output from IHS 110 may be provided via a display of or coupled to IHS 110. In another example, the output from IHS 110 may be provided via serial port. In one or more embodiments, the output illustrated in FIG. 4A may be a portion of output from IHS 110. For example, much more information may be output by IHS 110. For instance, outputting the information via one or more of a display and a serial port, among others, may hinder and/or slow down one or more operations of IHS 110.

Figure 4B:
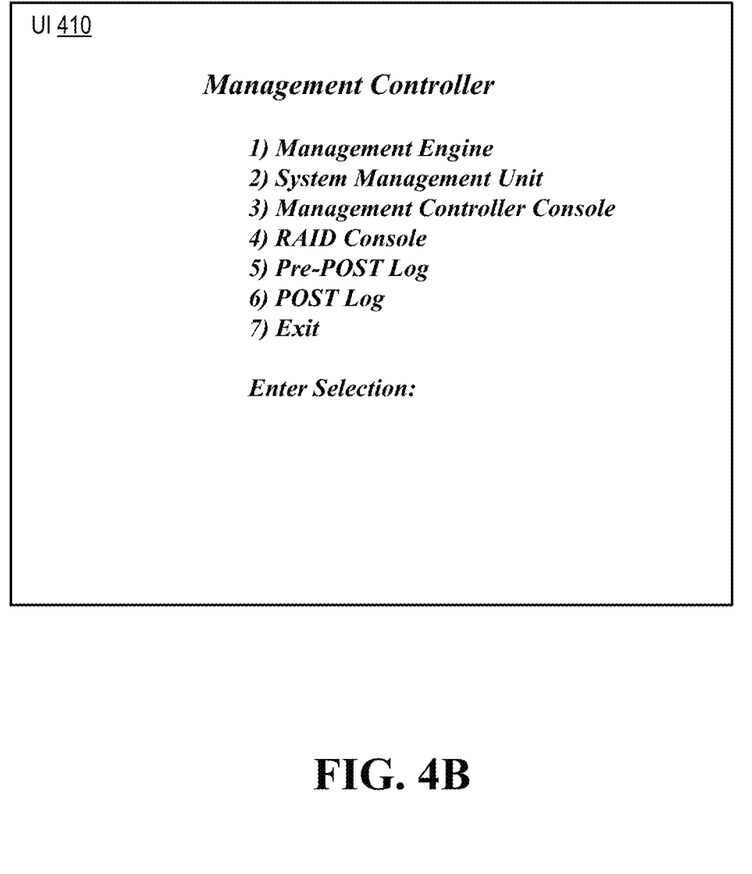
FIG. 4B illustrates an example of a menu of a user interface, according to one or more embodiments.

Turning now to FIG. 4B, an example of a menu of a user interface is illustrated, according to one or more embodiments. As shown, UI 410 may display a menu. In one or more embodiments, BMC 185 may provide the menu. In one example, BMC 185 may provide the menu via a display. In one instance, IHS 110 may include the display. In another instance, the display may be coupled to IHS 110. In a second example, BMC 185 may provide the menu via a serial port of IHS 110. In another example, BMC 185 may provide the menu to a remote information handling system. For instance, BMC 185 may provide the menu to the remote information handling system via a network and/or a network interface. In one or more embodiments, BMC 185 may capture and/or store the information illustrated in FIG. 4A. For example, BMC 185 may provide one or more portions of the information illustrated in FIG. 4A in response to a selection from the menu.

Figure 5:
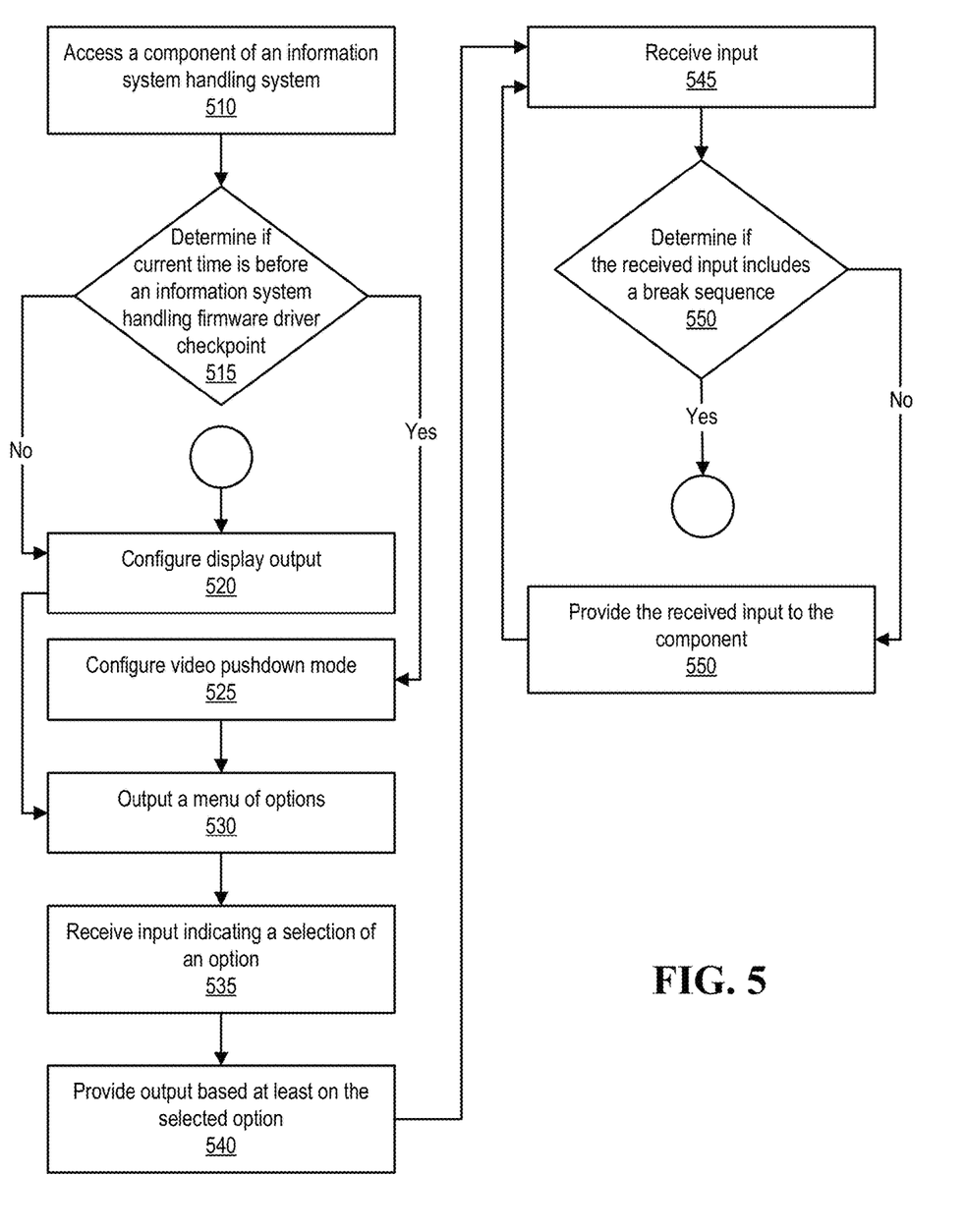
FIG. 5 illustrates an example of a method of operating a baseboard management controller, according to one or more embodiments.

Turning now to FIG. 5, an example of a method of operating a baseboard management controller is illustrated, according to one or more embodiments. At 510, a baseboard management controller may access a component of an information handling system. For example, BMC 185 may access a component 310 of IHS 110. In one or more embodiments, accessing the component of the information handling system may include receiving information from the component. In one or more embodiments, accessing the component of the information handling system may include receiving information via a bus that is coupled to the component. In one example, the baseboard management controller may access the component via the bus. In another example, the baseboard management controller may monitor the bus and receive information associated with the component. For instance, the baseboard management controller may copy information, from the bus, associated with the component.

At 515, it may be determined if a current time is before an information handling system firmware driver checkpoint. For example, determining if a current time is before an information handling system firmware driver checkpoint may include determining if the information handling system firmware driver checkpoint is loaded in a memory medium and/or is ready to be executed by processor 120.

If the current time is before an information handling system firmware driver checkpoint, a video push down mode may be configured, at 525. In one or more embodiments, the video push down mode may include storing information that would have been displayed via a display if an information handling system firmware driver associated with displaying information was ready to be executed. For example, if the information handling system is in pre-POST period and/or state, the information handling system firmware driver associated with displaying information may not be ready to be executed.

If the current time is not before an information handling system firmware driver checkpoint, display output may be configured, at 520. In one example, configuring display output may include configuring a display. In another example, configuring display output may include configuring circuitry of the information handling system associated with displaying output to a display.

At 530, a menu of options may be output. For example, a menu, as illustrated in FIG. 4B, may be output. In one instance, the menu may be output to a display. In a second instance, the menu may be output to a serial port. In another instance, the menu may be output to a remote information handling system. At 535, input indicating a selection of an option may be received. In one example, the input may be or include input from a keyboard. In a second example, the input may be or include input from a pointing device (e.g., a mouse, a trackpad, a click, etc.). In another example, the input may be or include information received from a remote information handling system. For instance, the input may be or include information received from a network and/or a network interface.

At 540, output may be provided based at least on the selection option. In one or more embodiments, the output may include information associated with a component of the information handling system. In one example, the output may include information associated with the component that was previously stored. In another example, the output may include information associated with the component that is currently being generated and/or provided by the component. At 545, input may be received. In one example, the input may be or include input from a keyboard. In a second example, the input may be or include input from a pointing device (e.g., a mouse, a trackpad, a click, etc.). In another example, the input may be or include information received from a remote information handling system. For instance, the input may be or include information received from a network and/or a network interface.

At 550, it may be determined if the input includes a break sequence. In one example, the break sequence may include a sequence of characters that indicates a conclusion of accessing information associated with the component. In another example, the break sequence may include input from a pointing device (e.g., a mouse, a trackpad, a click, etc.) that indicates a conclusion of accessing information associated with the component. If the input includes the break sequence, the method may proceed to 520, according to one or more embodiments. If the input does not include the break sequence, the input may be provided to the component, at 550. In one or more embodiments, the method may proceed to 545.

Figure 6:
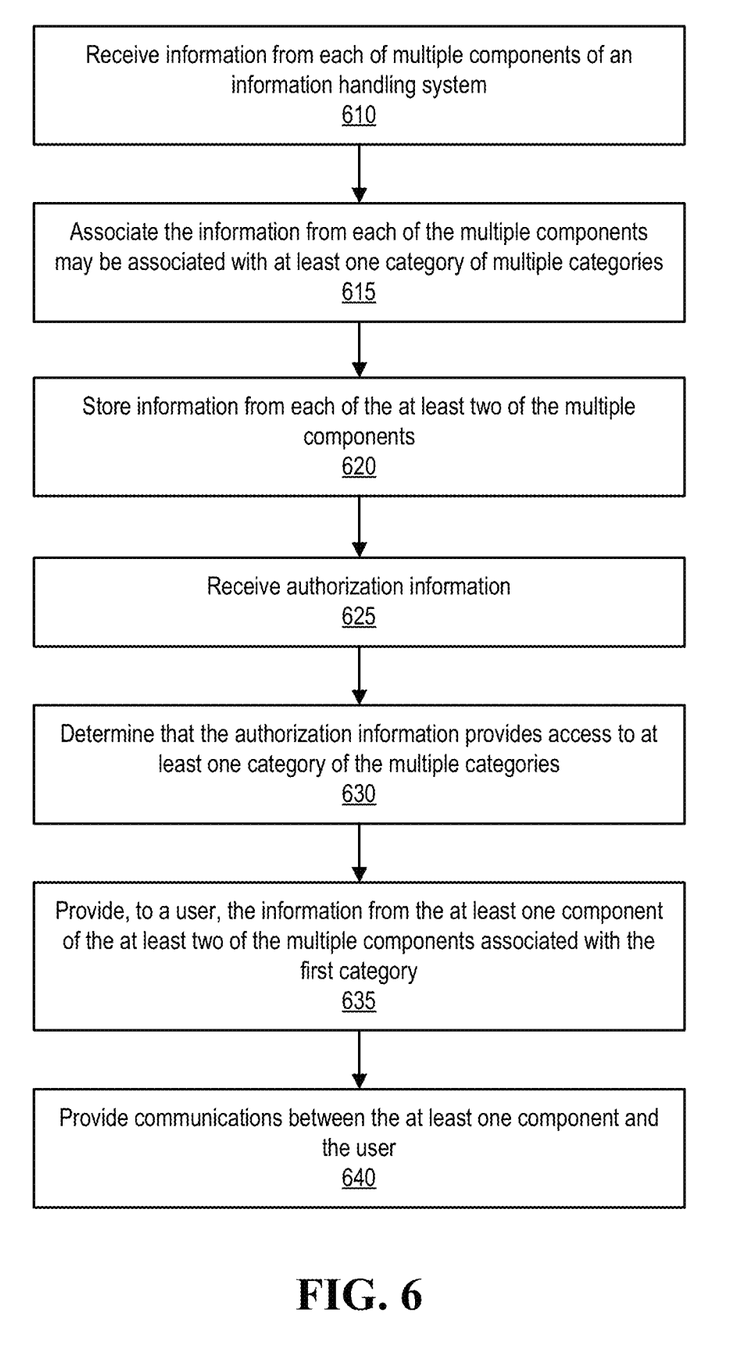
FIG. 6 illustrates an example method of operating an information handling system, according to one or more embodiments.

Turning now to FIG. 6, an example method of operating an information handling system is illustrated, according to one or more embodiments. At 610, information from each of multiple components of an information handling system may be received. For example, BMC 185 may receive information from each of multiple components 310 of IHS 110. In one or more embodiments, receiving information from each of multiple components may include receiving information from each of multiple components via one or more buses 320. In one or more embodiments, the information from each of multiple components of the information handling system may be received before a POST, during the POST, and/or after the POST.

At 615, the information from each of the multiple components may be associated with at least one category of multiple categories. For example, BMC 185 may associate the information from each of the multiple components with at least one category of multiple categories. In one or more embodiments, the multiple categories may include two or more of pre-POST information, POST information, RAID controller information, SAS controller information, network controller information, bus information, and management engine information, among others.

At 620, the information from each of the multiple components may be stored. For example, BMC 185 may store the information from each of the multiple components. In one instance, BMC 185 may store the information from each of the multiple components via non-volatile memory medium 160. In a second instance, BMC 185 may store the information from each of the multiple components via non-volatile memory medium 170. In another instance, BMC 185 may store the information from each of the multiple components via non-volatile memory medium 270.

At 625, authorization information may be received. For example, BMC 185 may receive authorization information. In one instance, the authorization information may include a password. In a second instance, the authorization information may include a license key. In another instance, the authorization information may include a digital certificate. In one or more embodiments, the digital certificate may be formatted in accordance with a X.509 standard. For example, the digital certificate may be or include a X.509 certificate. In one or more embodiments, the digital certificate may include one or more scope qualifiers. For example, one or more scope qualifiers may include one or more permissions that may permit, allow, and/or enable access to information of one or more categories. For instance, the digital certificate may indicate authorization to access one or more categories of the multiple categories. In one or more embodiments, the digital certificate may include one or more time attributes. In one example, a time attribute may indicate that access to information, which BMC 185 has received, may be accessed during one or more periods of time. In another example, a time attribute may indicate that access to information, which BMC 185 has received, may expire at a certain time and/or after an amount of time transpiring.

At 630, it may be determined that the authorization information provides access to at least one category of the multiple categories. For example, BMC 185 may determine that the authorization information provides access to at least one of the multiple categories. In one or more embodiments, the authorization information may be or include a digital certificate, and the digital certificate may indicate authorization to the at least one category. For example, the digital certificate may indicate authorization to the at least one category for an amount of time. For instance, BMC 185 may determine that the amount of time has concluded and, in response to determining that the amount of time has concluded, deny access to the at least one category.

At 635, the information from at least one component associated with the at least one category may be provided an information handling system operated by a user. For example, BMC 185 may provide the information from at least one component associated with the at least one category may be provided an information handling system operated by a user. In one instance, BMC 185 may provide the information from at least one component associated with the at least one category to the user via a display. In a second instance, BMC 185 may provide the information from at least one component associated with the at least one category to the user via a serial port. In a second instance, BMC 185 may provide the information from at least one component associated with the at least one category to the user via a network. In one or more embodiments, the user may utilize a remote or another information handling system via the network or the serial port. In one or more embodiments, providing, to the user, the information from at least one component associated with the at least one category may be performed in response to determining that the authorization information provides access to the at least one category.

In one or more embodiments, providing, to the user, the information from at least one component associated with the at least one category may be performed before a POST, during the POST, and/or after the POST. In one or more embodiments, providing, to the user, the information from at least one component associated with the at least one category may be performed while the information handling system is shut down. In one or more embodiments, providing, to the user, the information from at least one component associated with the at least one category may be performed after an operating system error caused the information handling system to reset.

At 640, communications between the at least one component and the user may be provided. For example, BMC 185 may provide communications between the at least one component and the user. In one instance, BMC 185 may provide communications between the at least one component and the user via one or more of a display, a keyboard, and a pointing device (e.g., a mouse, a trackpad, a trackball, etc.). In a second instance, BMC 185 may provide communications between the at least one component and the user via a serial port. In another instance, BMC 185 may provide communications between the at least one component and the user via a network. In one or more embodiments, the user may utilize a remote or another information handling system via the network or the serial port to communicate with the at least one component. In one or more embodiments, providing communications between the at least one component and the user may be performed in response to determining that the authorization information provides access to the at least one category. In one or more embodiments, providing communications between the at least one component and the user may be performed after an operating system error caused the information handling system to reset.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
a plurality of components; and
a baseboard management controller;

wherein the baseboard management controller is configured to:
  receive information from each of the plurality of components;
  associate the information from each of the plurality of components with at least one category of a plurality of categories of information associated with the information handling system;
  store the information from each of the plurality of components;
  receive authorization information that includes a digital certificate that indicates authorization to the at least one category;
  determine, via at least one scope qualifier of the digital certificate that permits access to the at least one category, that the authorization information provides access to the at least one category; and
  in response to determining that the authorization information provides access to the at least one category:
    provide the information from at least one component associated with the at least one category to a user; and
    provide communications between the at least one component and the user.

2. The information handling system of claim 1, wherein the baseboard management controller is further configured to:
  determine that the authorization information does not provide access to another category of the plurality of categories; and
  deny access to the other category.

3. The information handling system of claim 1, wherein, to provide the communications between the at least one component and the user, the baseboard management controller is further configured to provide the communications between the at least one component via at least one of a serial port of the information handling system and a network coupled to the information handling system.

4. The information handling system of claim 1, wherein the digital certificate indicates authorization to the at least one category for an amount of time.

5. The information handling system of claim 4, wherein the baseboard management controller is further configured to:
  determine that the amount of time has concluded; and
  in response to determining that the amount of time has concluded, deny access to the at least one category.

6. The information handling system of claim 1, wherein, to receive the information from each of the plurality of components, the baseboard management controller is further configured to receive the information from each of the plurality of components before a power on self test (POST) of the information handling system.

7. The information handling system of claim 1, wherein, to provide the information to the user, the baseboard management controller is further configured to provide the information to the user after an operating system error that caused the information handling system to reset.

8. A method, comprising:
  a baseboard management controller receiving information from each of a plurality of components of an information handling system;
  the baseboard management controller associating the information from each of the plurality of components with at least one category of a plurality of categories of information associated with the information handling system;
  the baseboard management controller storing the information from each of the plurality of components;
  the baseboard management controller receiving authorization information that includes a digital certificate that indicates authorization to the at least one category;
  the baseboard management controller determining, via at least one scope qualifier of the digital certificate that permits access to the at least one category, that the authorization information provides access to the at least one category; and
  in response to determining that the authorization information provides access to the at least one category:
    the baseboard management controller providing the information from at least one component associated with the at least one category to a user; and
    the baseboard management controller providing communications between the at least one component and the user.

9. The method of claim 8, further comprising:
  the baseboard management controller determining that the authorization information does not provide access to another category of the plurality of categories; and
  the baseboard management controller denying access to the other category.

10. The method of claim 8, wherein the baseboard management controller providing the communications between the at least one component and the user includes the baseboard management controller providing the communications between the at least one component and the user via at least one of a serial port of the information handling system and a network coupled to the information handling system.

11. The method of claim 8, wherein the digital certificate indicates authorization to the at least one category for an amount of time.

12. The method of claim 11, further comprising:
  the baseboard management controller determining that the amount of time has concluded; and
  in response to the baseboard management controller determining that the amount of time has concluded, the baseboard management controller denying access to the at least one category.

13. The method of claim 8, wherein the baseboard management controller receiving the information from each of the plurality of components of the information handling system includes the baseboard management controller receiving the information from each of the plurality of components before a power on self test (POST) of the information handling system.

14. The method of claim 8, wherein the baseboard management controller providing the information to the user is performed after an operating system error that caused the information handling system to reset.

15. A baseboard management controller, configured to:
  receive information from each of the plurality of components of an information handling system;
  associate the information from each of the plurality of components with at least one category of a plurality of categories of information associated with the information handling system;
  store the information from each of the plurality of components;
  receive authorization information that includes a digital certificate that indicates authorization to the at least one category;
  determine, via at least one scope qualifier of the digital certificate that permits access to the at least one category, that the authorization information provides access to the at least one category; and in response to determining that the authorization information provides access to the at least one category:
provide the information from at least one component associated with the at least one category to a user; and
provide communications between the at least one component and the user.

16. The baseboard management controller of claim 15, wherein the baseboard management controller is further configured to:
determine that the authorization information does not provide access to another category of the plurality of categories; and
deny access to the other category.

17. The baseboard management controller of claim 15, wherein, to provide the communications between the at least one component and the user, the baseboard management controller is further configured to provide the communications between the at least one component via at least one of a serial port of the information handling system and a network coupled to the information handling system.

18. The baseboard management controller of claim 15, wherein the digital certificate indicates authorization to the at least one category for an amount of time.

19. The baseboard management controller of claim 18, wherein the baseboard management controller is further configured to:
determine that the amount of time has concluded; and
in response to determining that the amount of time has concluded, deny access to the at least one category.

20. The baseboard management controller of claim 15,
wherein, to receive the information from each of the plurality of components, the baseboard management controller is further configured to receive the information from each of the plurality of components before a power on self test (POST) of the information handling system; and
wherein, to provide the information to the user, the baseboard management controller is further configured to provide the information to the user after an operating system error that caused the information handling system to reset.

* * * * *